United States Patent [19]

Shimbo et al.

[11] Patent Number: 4,500,984

[45] Date of Patent: Feb. 19, 1985

[54] EQUALIZER FOR REDUCING CROSSTALK BETWEEN TWO FDM/FM CARRIERS IN A SATELLITE COMMUNICATIONS SYSTEM

[75] Inventors: Osamu Shimbo, Bethesda, Md.; Lan N. Nguyen, Annandale; Jack L. Dicks, Alexandria, both of Va.

[73] Assignee: International Telecommunications Satellite Organization, Washington, D.C.

[21] Appl. No.: 427,097

[22] Filed: Sep. 29, 1982

[51] Int. Cl.³ .............................................. H04J 1/12
[52] U.S. Cl. ......................................... 370/6; 455/63
[58] Field of Search ................ 455/12, 59, 63, 71, 455/102, 103; 343/6.8 R; 320/6; 332/4.6, 43, 18, 37 R, 126; 330/4.6, 4.7; 375/60

[56] References Cited

U.S. PATENT DOCUMENTS

| | | | |
|---|---|---|---|
| 3,105,937 | 10/1963 | Brune et al. | 455/63 |
| 3,755,754 | 8/1973 | Putz | 332/37 R |
| 3,938,056 | 2/1976 | Pond | 330/43 |
| 4,041,413 | 8/1977 | Strothers, Jr. | 330/43 |
| 4,140,981 | 2/1979 | Bergman | 332/18 |
| 4,262,355 | 4/1981 | Schiff | 370/6 |

Primary Examiner—Douglas W. Olms
Assistant Examiner—Frank M. Scutch, III
Attorney, Agent, or Firm—Sughrue, Mion, Zinn, Macpeak and Seas

[57] ABSTRACT

A transmitting earth station for a satellite communications system in which the channel capacity of a two-carrier-per-transponder transmitter is greatly enhanced. The transmitting station is provided with an equalizer at the input to the high power amplifier (HPA). The transfer function of this equalizer assists in the reduction (in the first order approximation) of the intelligible crosstalk due to the non-linearities of the HPA, the travelling wave tube amplifier (TWTA) and the input transponder multiplexer. With the intelligible crosstalk reduced, the input backoff of the transponder TWTA may be reduced from −12dB to −6dB, which increases the channel capacity in the order of 500 channels.

6 Claims, 15 Drawing Figures

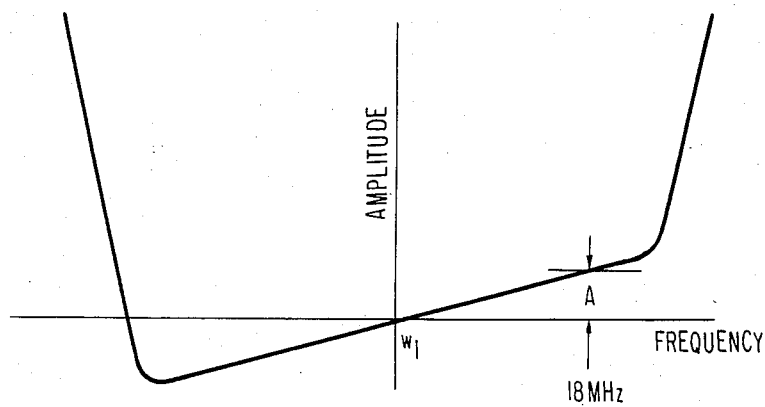
A = 0.5 dB FOR $F_I$ (EXAMPLE 1) AND $F_{II}$ (EXAMPLES 1 AND 2)
A = 0.15 dB FOR F (EXAMPLE 2)
FIG. 3a — FILTER AMPLITUDE RESPONSE
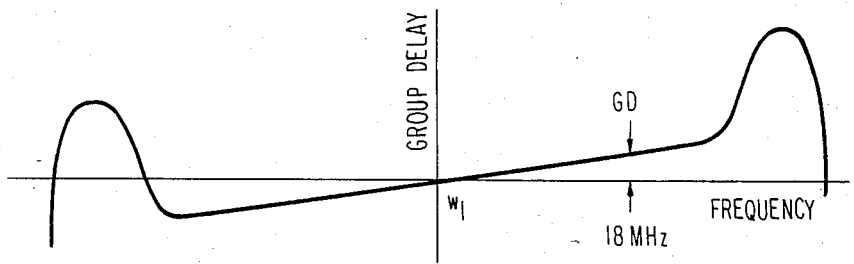
GD = 2 ns FOR $F_I$ (EXAMPLE 1) AND $F_{II}$ (EXAMPLES 1 AND 2)
GD = 0.5 ns FOR $F_I$ (EXAMPLE 2)
FIG. 3b   FILTER GROUP DELAY RESPONSE

FIG. 5

COMPUTED VALUES OF $D_{N_1F}$, $D_{N_1S}$, $D_{N_1T}$, $D_{N_1}$, AND $D_{N_2}$ (EXAMPLE 1)

| TWTA INPUT BACKOFF (dB) | HPA INPUT BACKOFF = -10 dB ||||| 
|---|---|---|---|---|---|
| | $D_{N_1F}$ (TERM (a)) | $D_{N_1S}$ (CROSS TERM (b)) | $D_{N_1T}$ (CROSS TERM (c)) | $D_{N_1}$ (TOTAL (a),(b) & (c)) | $D_{N_2}$ (TERM (d)) |
| -6 | 0.3200 | -0.0094 | 0.2960 | 0.6066 | 0.3420 |
| -8 | 0.3200 | -0.0194 | 0.2830 | 0.5836 | 0.3270 |
| -10 | 0.3200 | -0.0190 | 0.2220 | 0.5230 | 0.2560 |
| -12 | 0.3200 | -0.0143 | 0.1540 | 0.4597 | 0.1780 |
| -14 | 0.3200 | -0.0097 | 0.1000 | 0.4103 | 0.1160 |

FIG. 9a
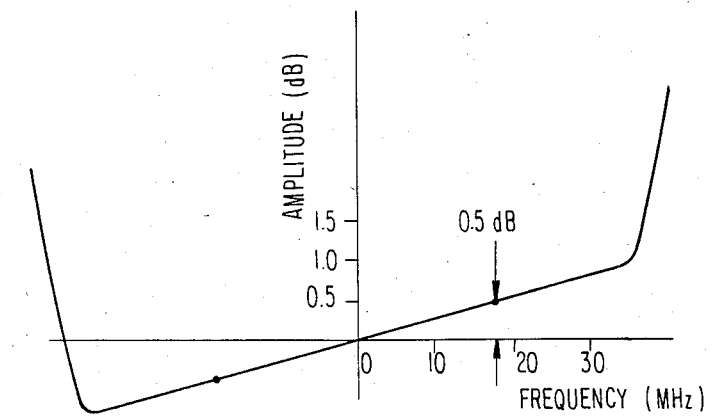
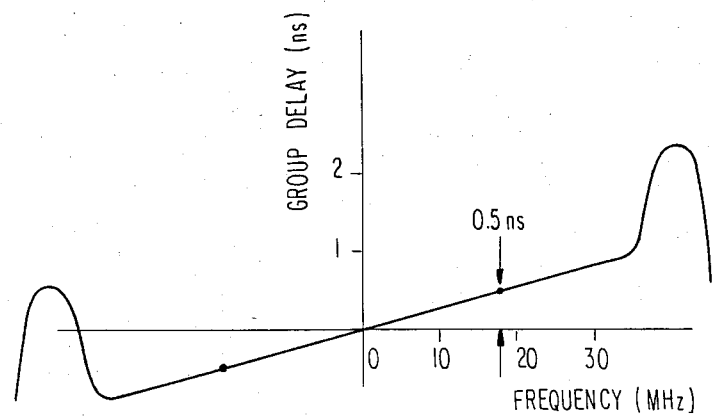
FIG. 9b

FIG.10 a
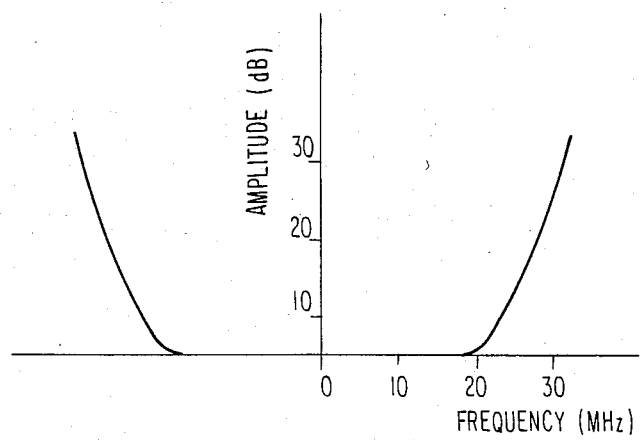
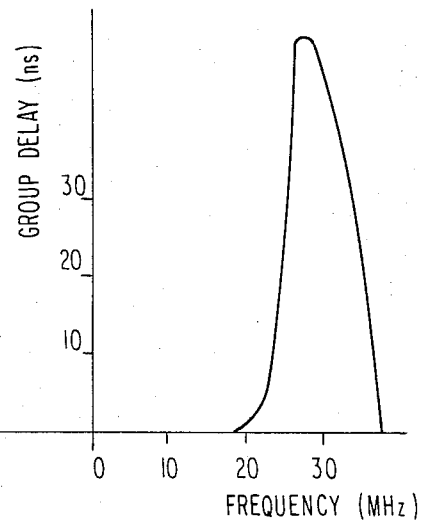
FIG.10 b

FIG. 11a
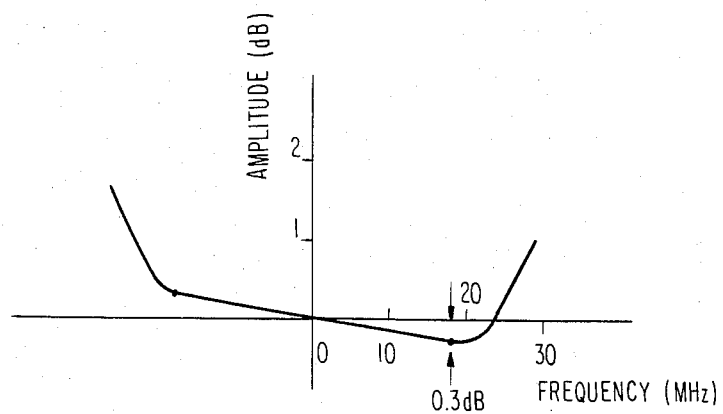
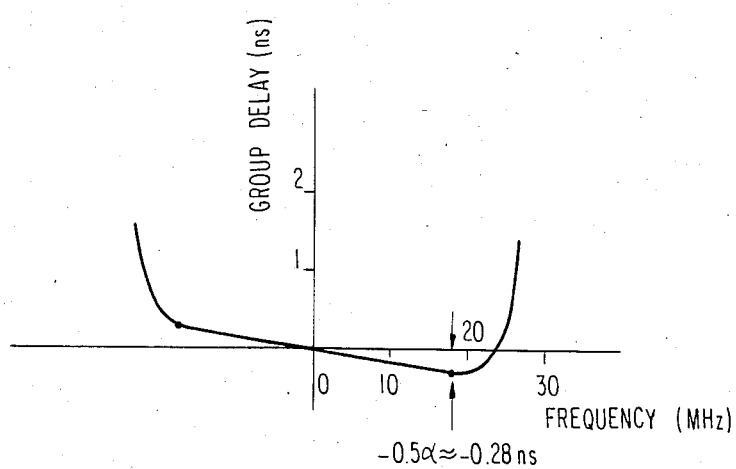
FIG. 11b
NOTES: 1.– $\alpha = 0.5638$ (TWTA INPUT BACKOFF = –6 dB)
2.– FOR THE FREQUENCY RANGES |f| > 18 MHz, THE RESPONSES ARE ALMOST IDENTICAL TO THOSE IN FIGURE 10.

EQUALIZER FOR REDUCING CROSSTALK BETWEEN TWO FDM/FM CARRIERS IN A SATELLITE COMMUNICATIONS SYSTEM

BACKGROUND OF THE INVENTION

The present invention relates generally to the field of satellite communications, and is specifically designed to increase the channel capacity of such a system utilizing two carriers per transponder by reducing the intelligible crosstalk between the two FDM/FM carriers.

In general, this crosstalk impairment is caused by amplitude modulation being imparted to a carrier as it passes through the bandpass filter preceding the non-linear amplifier. Due to the AM/PM characteristics of the non-linear amplifier, the amplitude fluctuation of this carrier will thus produce phase modulation in the other carrier. At the FM demodulator output of any particular carrier, a portion of this crosstalk is intelligible.

In existing FDM/FM satellite communications systems, two carriers per transponder are utilized because there are no commercially available modems having sufficient bandwidth to accommodate a single wideband carrier. When operating with two carriers per transponder, the transmitting power of the satellite transponder must be reduced (i.e., the satellite transponder traveling wave tube amplifier (TWTA) has an input backoff of approximately 12 dB) in order to prevent undesirable intelligible crosstalk between the two FM carriers.

In order to eliminate this crosstalk, prior art systems have used compensating filters between the FM modem output and the input to the non-linear high power amplifier for each carrier at the transmitting earth station. These filters have been used in order to linearize the response between the output of the earth station FM modulator and the input to the HPA. However, the transfer functions of such filters or equalizers do not account for the non-linearities inherent in the operation of both the HPA and the TWTA. Thus, such equalizers do not eliminate the intelligible crosstalk to the point where the nominal transponder TWTA operating point can be reduced less than minus 12 dB.

SUMMARY OF THE INVENTION

It is thus an object of the present invention to eliminate the crosstalk between two FDM/FM carriers concurrently transmitted by a single HPA and a single TWTA.

It is another object of the invention to increase the channel capacity of a satellite communications system by decreasing the TWTA input backoff from a minus 12 dB level to a level of minus approximately 6 dB.

It is a further object of the invention to provide an equalizer which cancels the intelligible crosstalk produced by the HPA and TWTA non-linearities.

The foregoing and other objects of the invention are realized through the provision of an equalizer at the input to the HPA of a transmitting earth station in a satellite communications system. The transfer function of the equalizer is determined mainly by the characteristics of the HPA and TWTA non-linearities as well as the transponder input multiplexer filter. Specifically, the transfer function of the equalizer is chosen such that the intelligible crosstalk will become zero under a first order approximation of the system response.

BRIEF DESCRIPTION OF THE DRAWINGS

The foregoing objects of the invention will become more apparent upon a detailed description of the preferred embodiments thereof. In the description to follow, reference will be made to the attached drawings, in which:

FIGS. 3A and 3B are graphs of two examples of the amplitude response and group delay of the filters.

FIG. 5 is a table of computed values of the four components of intelligible crosstalk for given TWTA and HPA input backoffs in the first and second examples of the invention, FIGS. 9A and 9B are graphs of the amplitude and group delay response of filter $F_{11}$ in a physical example of the invention, FIGS. 10A and 10B are graphs of the amplitude and group delay response of filter $Y^{(0)}(f)$ in a physical example of the invention, and FIGS. 11A and 11B are graphs of the amplitude and group delay response of the equalizer in a physical example of the invention.

DETAILED DESCRIPTION OF THE PREFERRED EMBODIMENTS

Double Intelligible Crosstalk Modeling and General Physical Interpretation

Figure 1:
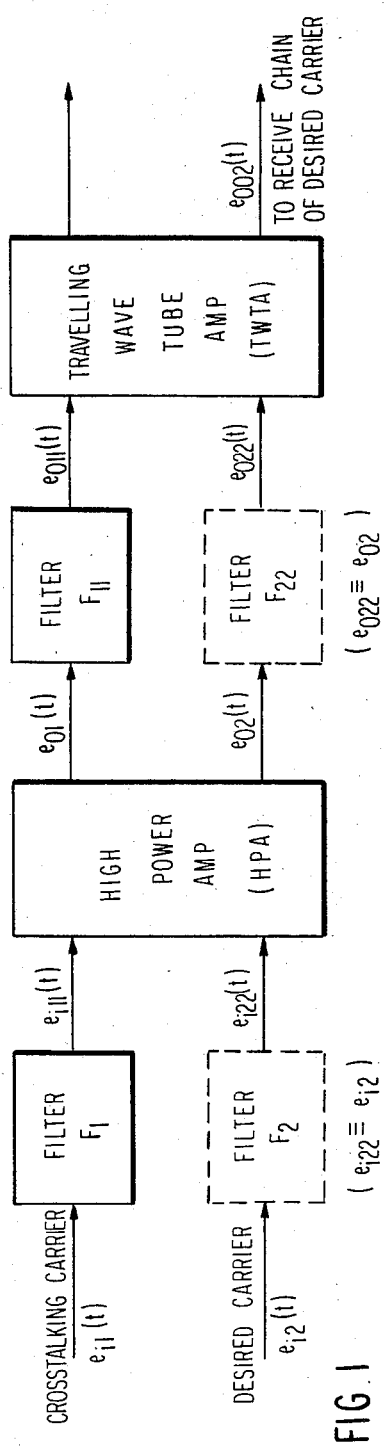
FIG. 1 is a schematic diagram of the total satellite transmission link of the present invention.

FIG. 1 is a general block diagram of a FDM/FM/FDMA satellite transmission link in which two FDM/FM carriers are passed through the same earth station HPA and transponder TWTA. The frequency characteristics of the transmission paths preceding the first nonlinearity (i.e., HPA) are represented by the filters $F_1$ and $F_2$, and those of the transmission path between the HPA output and the input to the second nonlinearity (i.e., TWTA) by the filters $F_{11}$ and $F_{22}$. In this system configuration, the filters $F_{11}$ and $F_{22}$ mainly represent the frequency characteristics of two portions of the same transponder input multiplexer filter.

Both the HPA and TWTA are assumed to be memoryless devices which exhibit AM/AM and AM/PM characteristics. In most cases, the HPA nonlinear characteristics are much worse than those of the TWTA. It is also assumed that the filters $F_2$ and $F_{22}$ are transparent in the desired carrier path, and the difference between any two electrical path lengths of all transmit signal paths is at most a few nanoseconds, which implies that practically all the intelligible crosstalk components can be added coherently.

Figure 2:
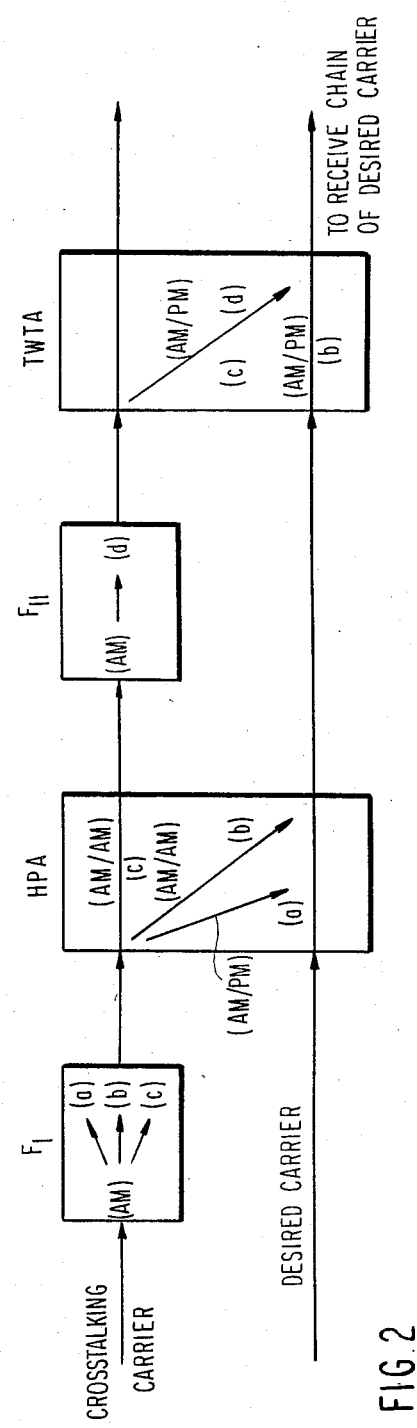
FIG. 2 is a schematic diagram of a physical interpretation of the four components of the intelligible crosstalk.

A physical interpretation of the four distortion components constituting the double intelligible crosstalk impairment as shown in FIG. 2 can be summarized as follows:

(a) The amplitude of the crosstalking carrier receives a small amount of amplitude modulation as it passes through the filter $F_1$. This amplitude fluctuation, which contains the intelligible component of the baseband signal of the crosstalking carrier, is transferred into the phase of the desired carrier due to the AM/PM conversion characteristics of the HPA when both carriers pass through the HPA. The first distortion component is due to this effect.

(b) The second distortion component (cross term) is due to the fact that the amplitude fluctuation described in (a) causes a small amount of amplitude fluctuation in the desired signal due to the HPA AM/AM characteristics. Subsequently, this resultant amplitude fluctuation is then transferred into the phase of the desired carrier due to the TWTA AM/PM characteristics as this carrier passes through the TWTA.

(c) Similarly, the third distortion component (cross term) is also due to the amplitude fluctuation described in (a). This amplitude fluctuation of the crosstalking carrier is suppressed by the HPA AM/AM characteristics as this carrier passes through the HPA. This resultant amplitude fluctuation is then transferred into the phase of the desired carrier due to the TWTA AM/PM characteristitics when both carriers pass through the TWTA.

(d) The fourth distortion component is due to the filter $F_{11}$ and TWTA. At the output of the filter $F_{11}$, the crosstalking carrier receives another amplitude fluctuation, which again is transferred into the phase of the desired carrier due to the TWTA AM/PM characteristics.

It is noted that the first three components are due to filter $F_1$, HPA and TWTA while the last component is due to filter $F_{11}$ and the TWTA. These terms will be added on a voltage basis. The second distortion component appears to be negligible compared to the others since the transfer of the amplitude fluctuation (after the filter $F_1$) of the crosstalking carrier into the amplitude of the desired carrier by the HPA is fairly small. Additionally, the third distortion component tends to be more suppressed by the amplitude non-linearity of the HPA as the HPA operating point moves from the linear region to the saturation region.

At the TWTA output, the desired carrier, which is required in the evaluation of double intelligible crosstalk impairment, is given by:

$$e_{oo2}(t) = M_T\left(|B_2|\left[1 + Re\left(\frac{1}{B_2}\frac{\partial B_2}{\partial A_1}\right)A_1\epsilon_1(t)\right],\right. \quad (1)$$

$$|B_1| \cdot \left[1 + Re\left(\frac{1}{B_1}\frac{\partial B_1}{\partial A_1}\right)A_1\epsilon_1(t) + \epsilon_{11}(t)\right]\right) \cdot$$

$$\exp\left[j\omega_2 t + j\phi_2(t) + j\angle B_2 + j\,Im\left(\frac{1}{B_2}\frac{\partial B_2}{\partial A_1}\right)A_1\epsilon_1(t)\right].$$

where $\angle$ denotes the angle of a complex number, $A_1$ is the amplitude of the crosstalking carrier at the FM modulator output, $\epsilon_1(t)$ is the amplitude distortion imparted by $F_1$, $\epsilon_{11}(t)$ is the amplitude distortion imparted by $F_{11}$, $B_2$ is the desired carrier amplitude at the output of the HPA which is a complex function of $A_1$ and $A_2$ given by: $B_2 = M_H(A_2, A_1)$ where $A_2$ is the amplitude of the desired carrier at the FM modulator output, $B_1 = M_H(A_1, A_2)$ is the crosstalking carrier amplitude at the output of the HPA, and $M_T(|B_2|, |B_1|)$ is a complex function relating to the amplitude of the desired carrier at the output of the TWTA. (The functions $M_T$ and $M_H$ are derived in the article "Time Domain Analysis of Intermodulation Effects Caused by Non-Linear Amplifiers", J. D. Fuenzalida, O. Shimbo, and W. L. Cook, *COMSAT Technical Review*, Vol. 3, No. 1, pp. 89–143, Spring 1973.) This equation for $e_{oo2}(t)$ has been derived by expanding the crosstalking carrier and the desired carrier in Taylor series expansions with respect to $\epsilon_1(t)$.

In deriving the foregoing equation, several important approximations have been adopted. First, the filters $F_2$ and $F_{22}$ are assumed to be transparent in the desired carrier path. This is a valid assumption since the baseband distortions of the desired carrier due to these filters are not of an intelligible crosstalk nature. The filter distortions of the intelligible crosstalk components, which are very small compared with the desired carrier baseband signal, are also much smaller than these intelligible crosstalk components. Consequently, these distortions due to the filters $F_2$ and $F_{22}$ are ignorable. Thus, the assumption of the transparency of these two filters does not affect the results. Second, it is implicitly assumed here that the amplitude and group delay of $F_1$ around $\omega_1$ are approximately at 0 dB attenuation and 0 second delay. This normalization assures the validity of the first order approximation, i.e., $|\epsilon_1(t)| << 1$ and $|\Delta_1(t)| << 1$. The generality of the analysis is not affected by this normalization since the normalization in amplitude only changes the magnitude of the signal whereas that in group delay (constant group delay difference) only shifts the signal in time without distortion. If $\epsilon_1(t)$ and $\Delta_1(t)$ are not small (i.e., normalization in amplitude and group delay not assumed) then the first order approximation theory normally used in practice is no longer applicable.

Expanding (1) in a Taylor series expansion with respect to $\epsilon_1$ and $\epsilon_{11}$, and taking only the first order terms, then $$e_{oo2}(t) \approx \left\{M_T(|B_2|,|B_1|) + \frac{jM_T(|B_2|,|B_1|)}{|B_2|}|B_2|A_1\epsilon_1(t)\cdot\right.$$

$$Re\left(\frac{1}{B_2}\frac{\partial B_2}{\partial A_1}\right) - \frac{jM_T(|B_2|,|B_1|)}{|B_1|}|B_1|\left[A_1\epsilon_1(t)\cdot\right.$$

$$\left.Re\left(\frac{1}{B_1}\frac{\partial B_1}{\partial A_1}\right) - \epsilon_{11}(t)\right]\right\} \cdot \exp\left[j\omega_2 t - j\phi_2(t) -\right.$$

$$\left.\angle B_2 - j\,Im\left(\frac{1}{B_2}\frac{\partial B_2}{\partial A_1}\right)A_1\epsilon_1(t)\right].$$

The desired carrier at the TWTA output can be further simplified and expressed as:

$$e_{oo2}(t) \approx |M_T(|B_2|,|B_1|)|\left\{1 - Re\left[\frac{jM_T(|B_2|,B_1|)}{|B_2|}\cdot\frac{1}{M_T(|B_2|,B_1|)}\right]B_2\right.$$

-continued $$A_1\epsilon_1(t) Re\left(\frac{1}{B_2} \frac{\partial B_2}{\partial A_1}\right) +$$

$$Re\left[\frac{\frac{\partial M_T(|B_2|,|B_1|)}{\partial |B_1|}}{M_T(|B_2|,|B_1|)}\right] |B_1| \left[A_1\epsilon_1(t) \cdot\right.$$

$$\left. Re\left(\frac{1}{B_1} \frac{\partial B_1}{\partial A_1}\right) + \epsilon_{11}(t)\right]\right\} \cdot \exp\left\{j\omega_2 t + j\phi_2(t) + \right.$$

$$j\angle B_2 + j\,Im\left(\frac{1}{B_2} \frac{\partial B_2}{\partial A_1}\right) A_1\epsilon_1(t) +$$

$$j\,Im\left[\frac{\frac{\partial M_T(|B_2|,|B_1|)}{\partial |B_2|}}{M_T(|B_2|,|B_1|)}\right] Re\left(\frac{1}{B_2} \frac{\partial B_2}{\partial A_1}\right) A_1|B_2|\epsilon_1(t) +$$

$$j\,Im\left[\frac{\frac{\partial M_T(|B_2|,|B_1|)}{\partial |B_1|}}{M_T(|B_2|,|B_1|)}\right] Re\left(\frac{1}{B_1} \frac{\partial B_1}{\partial A_1}\right) A_1|B_1|\epsilon_1(t) +$$

$$\left. j\,Im\left[\frac{\frac{\partial M_T(|B_2|,|B_1|)}{\partial |B_1|}}{M_T(|B_2|,|B_1|)}\right] |B_1|\epsilon_{11}(t)\right\}.$$

In (3) only the phase is important because the amplitude modulation is going to be eliminated by the hard limiter before the FM discriminator. The fourth, fifth, sixth, and seventh terms in the phase of (3) contain the intelligible crosstalk components.

Define:

$$C_1 = M_T(|B_1|,|B_2|), \tag{4}$$

$$C_2 = M_T(|B_2|,|B_1|). \tag{5}$$

In (3), the relevant phase component, I(t), which contains the above four terms, can be expressed as:

$$I(t) = \left[Im\left(\frac{A_1}{B_2} \frac{\partial B_2}{\partial A_1}\right) + \right. \tag{6}$$

$$Im\left(\frac{|B_2|}{C_2} \frac{\partial C_2}{\partial |B_2|}\right) Re\left(\frac{A_1}{B_2} \frac{\partial B_2}{\partial A_1}\right) +$$

$$\left. Im\left(\frac{|B_1|}{C_2} \frac{\partial C_2}{\partial |B_1|}\right) Re\left(\frac{A_1}{B_1} \frac{\partial B_1}{\partial A_1}\right)\right] \epsilon_1(t) +$$

$$Im\left(\frac{|B_1|}{C_2} \frac{\partial C_2}{\partial |B_1|}\right) \epsilon_{11}(t).$$

The first term of the coefficient of $\epsilon_1(t)$ corresponds to the intelligible crosstalk component (a) of FIG. 2, the second term to that of (b) in FIG. 2, and the third term to that of (c) in FIG. 2. The coefficient of $\epsilon_{11}(t)$ corresponds to the component designated (d) in FIG. 2. It is to be appreciated that the term $Re[(A_1/B_2)(\partial B_2/\partial A_1)]$ represents the amplitude transfer from the amplitude fluctuation of the crosstalking carrier to the desired carrier amplitude due to the HPA as in (b) of FIG. 2. Also, the term $Re[(A_1/B_1)(\partial B_1/\partial A_1)]$ represents the suppression of the amplitude fluctuation of the crosstalking carrier due to the HPA as in (c) of FIG. 2.

Rewriting (6) as:

$$I(t) = (D_{N1F} + D_{N1S} + D_{N1T})\epsilon_1(t) + D_{N2}\epsilon_{11}(t), \tag{7}$$

or $$I(t) = D_{N1}\epsilon_1(t) + D_{N2}\epsilon_{11}(t), \tag{8}$$

the terms $D_{N1F}$, $D_{N1S}$, and $D_{N1T}$ represent respectively the first, second, and third terms of the coefficient $D_{N1}$ of $\epsilon_1(t)$ and $D_{N2}$ is the coefficient of $\epsilon_{11}(t)$. It is to be appreciated that there will be some differences in propagation time among the distortion components included in $\epsilon_1(t)$ and $\epsilon_{11}(t)$ due to variations in the propagation time in various transmission path lengths. However, since the two carriers are generated at the same earth station and since the assumption that the maximum time difference is about a few nanoseconds is practically true, the four intelligible crosstalk components can be added on a voltage basis because the effect of the time difference at baseband frequencies is negligible for any voice channel since the top baseband frequency of the desired carrier is at most a few megahertz.

At the output of the FM discriminator, in addition to the desired carrier baseband signal, $$\frac{1}{2\pi} \frac{d\phi_2(t)}{dt},$$

there will be intelligible crosstalk components included in $$\frac{1}{2\pi} \frac{dI(t)}{dt}.$$

Power Spectrum of Intelligible Crosstalk Components after FM Demodulation

The phase component, I(t), includes the direct current component, unintelligible noise components, and intelligible crosstalk components. In order to separate the last components from the others, the autocorrelation function of I(t) is obtained. Then the power spectrum of intelligible crosstalk components after FM demodulation can be evaluated by Fourier transformation.

The crosstalking carrier at $F_1$ output, $e_{i11}(t)$, can be expressed as:

$$e_{i11}(t) = A_1 e^{j\omega_1 t}[e^{j\phi_1(t)} * h_1(t)], \tag{9}$$

where * denotes the convolution operation, and $h_1(t)$, the equivalent low-pass impulse response of $F_1$, is in general complex.

Under the assumption of first-order theory, (9) yields:

$$e^{-j\phi_1(t)}[e^{j\phi_1(t)} * h_1(t)] = [1 + \epsilon_1(t)]e^{j\Delta_1(t)} \tag{10}$$

$$= [1 + \epsilon_1(t)] + j\Delta_1(t).$$

Therefore:

$$\epsilon_1(t) = Re\{e^{-j\phi_1(t)}[e^{j\phi_1(t)} * h_1(t)] - 1\} \quad (11)$$

Similarly to (11), from (8):

$$I(t) = Re\left\{ \int_{-\infty}^{\infty} [D_{N1}h_1(x) + D_{N2}h_{11}(x)]e^{-j\phi_1(t)+j\phi_1(t-x)}dx - (D_{N1} + D_{N2}) \right\}, \quad (12)$$

where $h_{11}(t)$, the equivalent low-pass impulse response of $F_{11}$ is also complex. The term $(D_{N1}+D_{N2})$ will be dropped in (12) for convenience of analysis since it eventually gives only the direct current component.
Let:

$$h(t) = D_{N1}h_1(t) + D_{N2}h_{11}(t), \quad (13)$$

then:

$$I(t) = Re\left[ \int_{\infty}^{\infty} h(x)e^{-j\phi_1(t)+j\phi_1(t-x)}dx \right]. \quad (14)$$

Using the formula:

$$Re(a)Re(b) = \tfrac{1}{2}Re(ab^*) + \tfrac{1}{2}Re(ab), \quad (15)$$

where:

$$a(t) = \int_{-\infty}^{\infty} h(x)e^{-j\phi_1(t)+j\phi_1(t-x)}dx, \text{ and} \quad (16)$$

$$b(t+\tau) = \int_{-\infty}^{\infty} h(y)e^{-j\phi_1(t+\tau)+j\phi_1(t+\tau-y)}dy \quad (17)$$

and the notation a*, for example, denotes the complex conjugate of a, the autocorrelation of I(t) is given by:

$$\overline{I(t)I(t+\tau)} = \tfrac{1}{4}\overline{a(t)b^*(t+\tau)} + \tfrac{1}{4}\overline{a^*(t)b(t+\tau)} + \tfrac{1}{4}\overline{a(t)b(t+\tau)} + \tfrac{1}{4}\overline{a^*(t)b^*(t+\tau)}. \quad (18)$$

The power spectrum of the intelligible crosstalk components included in (18) can then be shown to be:

$$\frac{W_{\phi 1}(f)}{4} |G(f) - G^*(-f)|^2, \quad (19)$$

in which:

$$G(f) = \int_{-\infty}^{\infty} Y(x)[W_{C1}(x) - W_{C1}(f+x)]dx. \quad (20)$$

where $W_{\phi 1}(f)$ is the power spectrum of $\phi_1(t)$, $W_{c1}(f)$ the power spectrum of the crosstalking carrier with its average power normalized to unity power and its carrier frequency shifted to zero (negative frequency used), and Y(f) the Fourier transform of h(t).

It is noted here that Y(f) actually represents the combined modified transfer function of the equivalent low-pass filter of the bandpass filters $F_1$ and $F_{11}$ according to (13). Both positive and negative frequencies are considered in Y(f). In terms of the equivalent low-pass filters of $F_1$ and $F_{11}$, (19) can also be expressed as:

$$\frac{W_{\phi 1}(f)}{4} \left| \int_{-\infty}^{\infty} [W_{C1}(x) - W_{C1}(f-x)] \cdot \{D_{N1}[Y_{C-}^{(1)}(x) - Y_{C+}^{(1)*}(-x)] + D_{N2}[Y_{C+}^{(11)}(x) - Y_{C-}^{(11)*}(-x)]\} \right|^2, -\infty < f < \infty. \quad (21)$$

where $Y_{C+}^{(1)}(f)$ and $Y_{C+}^{(11)}(f)$ are respectively the transfer functions of the equivalent low-pass filters of $F_1$ and $F_{11}$. (For example, $Y_{C+}^{(1)}(f)$ can be obtained by shifting the positive-frequency portion of the bandpass transfer function of $F_1$ to zero.)

Finally, the power spectrum of the intelligible crosstalk components after FM demodulation is (considering only positive frequency):

$$\tfrac{1}{4}f^2 W_{\phi 1}(f) \left| \int_{-\infty}^{\infty} [W_{C1}(x) - W_{C1}(f-x)] \cdot [Y(x) - Y^*(-x)]dx \right|^2, 0 \leq f < \infty. \quad (22)$$

where:

$$Y(f) = D_{N1} Y_{C-}^{(1)}(f) - D_{N2} Y_{C+}^{(11)}(f), \quad (23)$$

where Y(f) is not normalized such that Y(0)=1.
Thus, if the filters are symmetric, i.e., $$Y_{C+}^{(1)}(f) = Y_{C+}^{(1)}(-f), \text{ and} \quad (24)$$

$$Y_{C+}^{(11)}(f) = Y_{C+}^{(11)*}(-f), \quad (25)$$

the intelligible crosstalk will become zero under the first order approximation.

Calculation of Intelligible Crosstalk Ratio

When noise loading is assumed for the FDM/FM baseband signals, the intelligible crosstalk ratio (ICR) can be computed in terms of the noise power ratio (NPR). Thus, the ICR at any desired baseband frequency f after the de-emphasis is:

$$ICR(f) = \frac{\text{Desired channel power}}{\text{Crosstalk noise power}}, f_{l2} \leq f \leq f_{h2} \quad (26)$$

in which:

$$\text{Desired channel power} = \sigma_2^2 / N_2, \quad (27)$$

and $$\text{Crosstalk noise power} = \tfrac{1}{4} \left| \int_{-\infty}^{\infty} W_{C1}(x) - \right. \quad (28)$$

-continued $$W_{C1}(f+x)][Y(x) - Y^*(-x)]dx \bigg|^2 \cdot \frac{\sigma_1^2}{N_1} \cdot \frac{P_1(f)}{P_2(f)}$$

where $\sigma_2$ is the rms multichannel deviation of the desired carrier, $N_2$ its number of channels, $f_{l2}$ its lowest baseband frequency, $f_{h2}$ its highest baseband frequency; $\sigma_1$ is the rms multichannel deviation of the crosstalking carrier, $N_1$ its number of channels; and $P_1(f)$ and $P_2(f)$ are the pre-emphasis factors of the crosstalking and desired carriers respectively.

Filter Transfer Functions

EXAMPLE 1: Identical $F_1$ and $F_{11}$

In this example, it is assumed that $F_1$ and $F_{11}$ have identical transfer functions. FIG. 3 shows the amplitude and group delay responses in which the slope of the amplitude in the carrier bandwidth is 1 dB in 36 MHz and that of the group delay 4 ns in 36 MHz. It should be noted here that the symmetric portions in both amplitude and group delay responses do not contribute to the intelligible crosstalk impairment.

Figure 4:
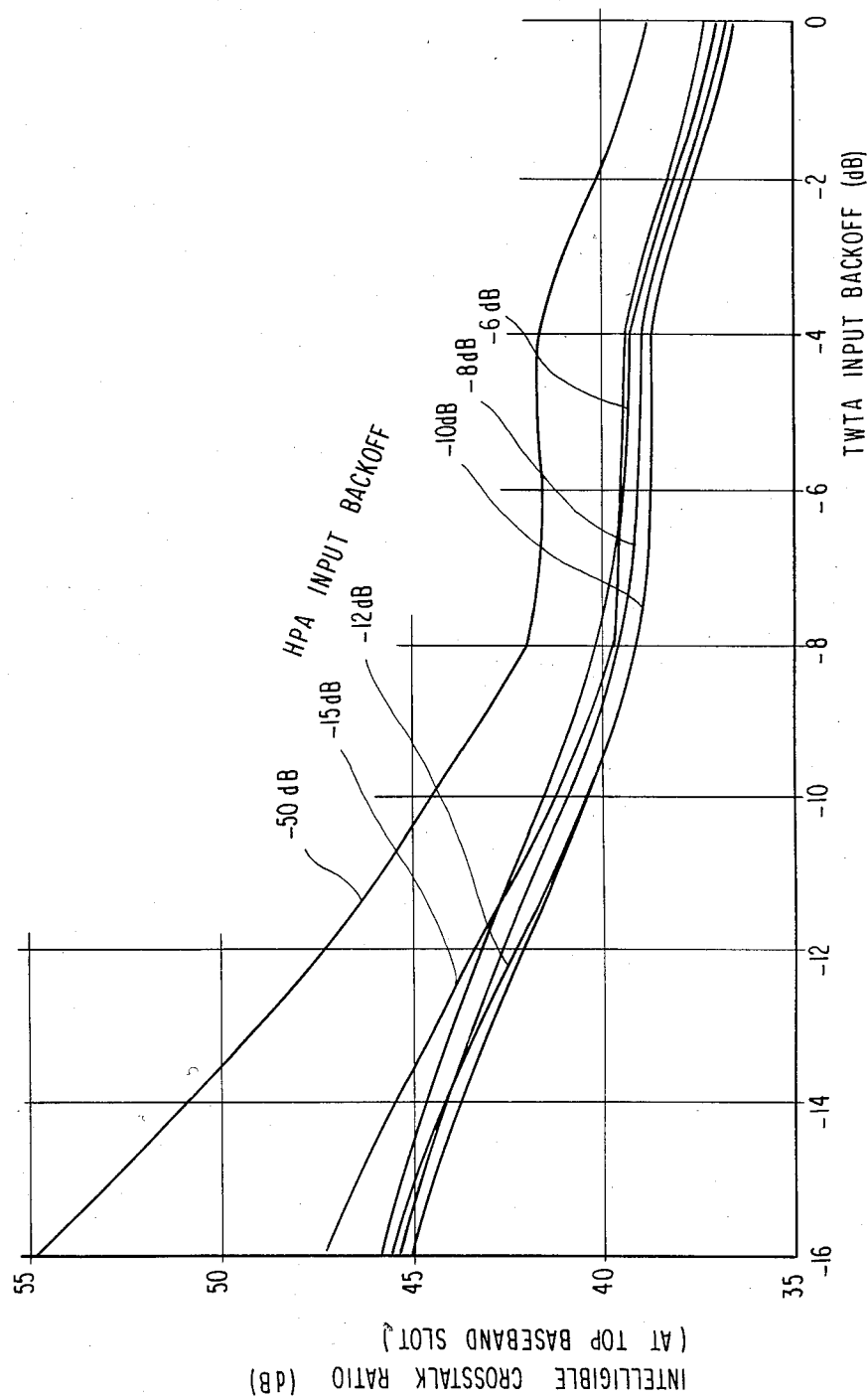
FIG. 4 is a graph of intelligible crosstalk ratio (ICR) versus HPA and TWTA input backoffs in a first example of the invention.

FIG. 4 shows the calculated intelligent crosstalk ratio ICR (in terms of NPR) at various HPA and TWTA input backoffs. From these numerical results, it can be seen that degradations in the ICR are controlled by the AM/PM characteristics of the HPA. However, the ICR's are found to be not sensitive to changes in the HPA operating point. Also, in the TWTA input backoff range of −6 to −14 dB, the ICR's obtained at a HPA input backoff of −10 dB are much worse than those at a backoff of −50 dB (equivalent to the case with $F_1$ and $F_{11}$ linearly cascaded, and no HPA). This means that because of HPA nonlinearities, the amplitude and group delay responses of $F_1$ must be much more severely specified than those of $F_{11}$ in order to make the effects of $F_1$ negligible.

FIG. 5 shows a table of values of $D_{N1F}$, $D_{N1S}$, $D_{N1T}$, $D_{N1}$, and $D_{N2}$ at a HPA input backoff of −10 dB and TWTA input backoff range of −6 to −14 dB. It can be seen that component (a) of FIG. 2, which corresponds to $D_{N1F}$ as previously described, tends to dominate over all other components, namely (b), (c), and (d) of FIG. 2. Also, in any backoff areas of TWTA shown in FIG. 5, cross term (b) is small and negative; and cross term (c) is close to component (d) except that there is a suppression effect (which becomes larger when the HPA operating point moves to the saturation region) due to the HPA AM/AM characteristics.

Therefore, it is preferable that the distortion effects of $F_1$ should be negligible since they can be controlled at the transmitting earth station.

EXAMPLE 2: $F_1$ Better than $F_{11}$

Figure 6:
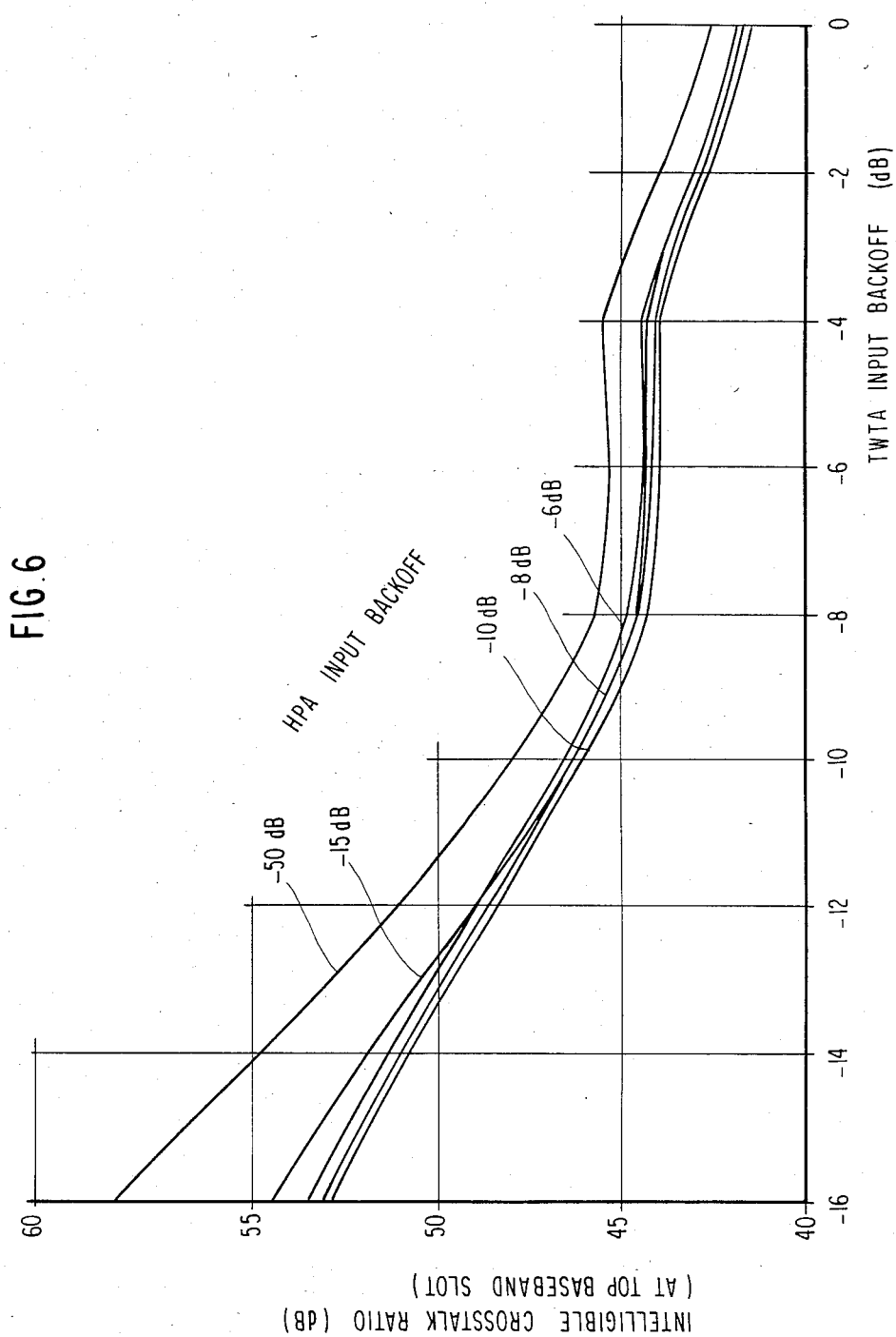
FIG. 6 is a graph of ICR versus HPA and TWTA input backoffs in a second example of the invention.

In this example, the responses of $F_1$ will be improved (e.g., slopes of the amplitude and group delay responses of 0.3 dB and 1 ns in 36 MHz respectively as shown in FIG. 4). FIG. 6 shows the calculated ICR's for the same HPA and TWTA input backoffs. The HPA and TWTA are found to have almost the same effects on the ICR as the case in which there is no HPA. Comparison of FIGS. 5 and 6 shows that the effects of $F_1$ are now smaller than those of the previous example and are almost negligible. Also, the ICR's are much better than those of the previous example.

The above examples clearly indicate that in order to control crosstalk impairment effects in satellite channels in which two carriers access both the HPA and TWTA, the filter characteristics of $F_1$ at the transmit side must be more severely specified than $F_{11}$.

Improvement of Intelligible Crosstalk Ratio in an Operational Environment According to the Invention A new transfer function is defined as:

$$Y^{(0)}(f) = \frac{Y(f)}{D_{N1} + D_{N2}}. \tag{29}$$

In this case, $Y^{(0)}(f)$ is also normalized such that:

$$Y^{(0)}(0) = 1, \tag{30}$$

since $Y_{C+}^{(1)}(0) = 1$ and $Y_{C+}^{(11)}(0) = 1$. Using this normalized overall transfer function $Y^{(0)}(f)$, Equation (23) becomes:

$$(D_{N1} + D_{N2}) Y^{(0)}(f) = D_{N1} Y_{C+}^{(1)}(f) + D_{N2} Y_{C+}^{(11)}(f) \tag{31}$$

Therefore, $Y_{C+}^{(1)}(f)$ is equal to:

$$Y_{C+}^{(1)}(f) = (1 + \alpha) Y^{(0)}(f) - \alpha Y_{C+}^{(11)}(f), \tag{32}$$

where:

$$\alpha = \frac{D_{N2}}{D_{N1}}. \tag{33}$$

Figure 8:
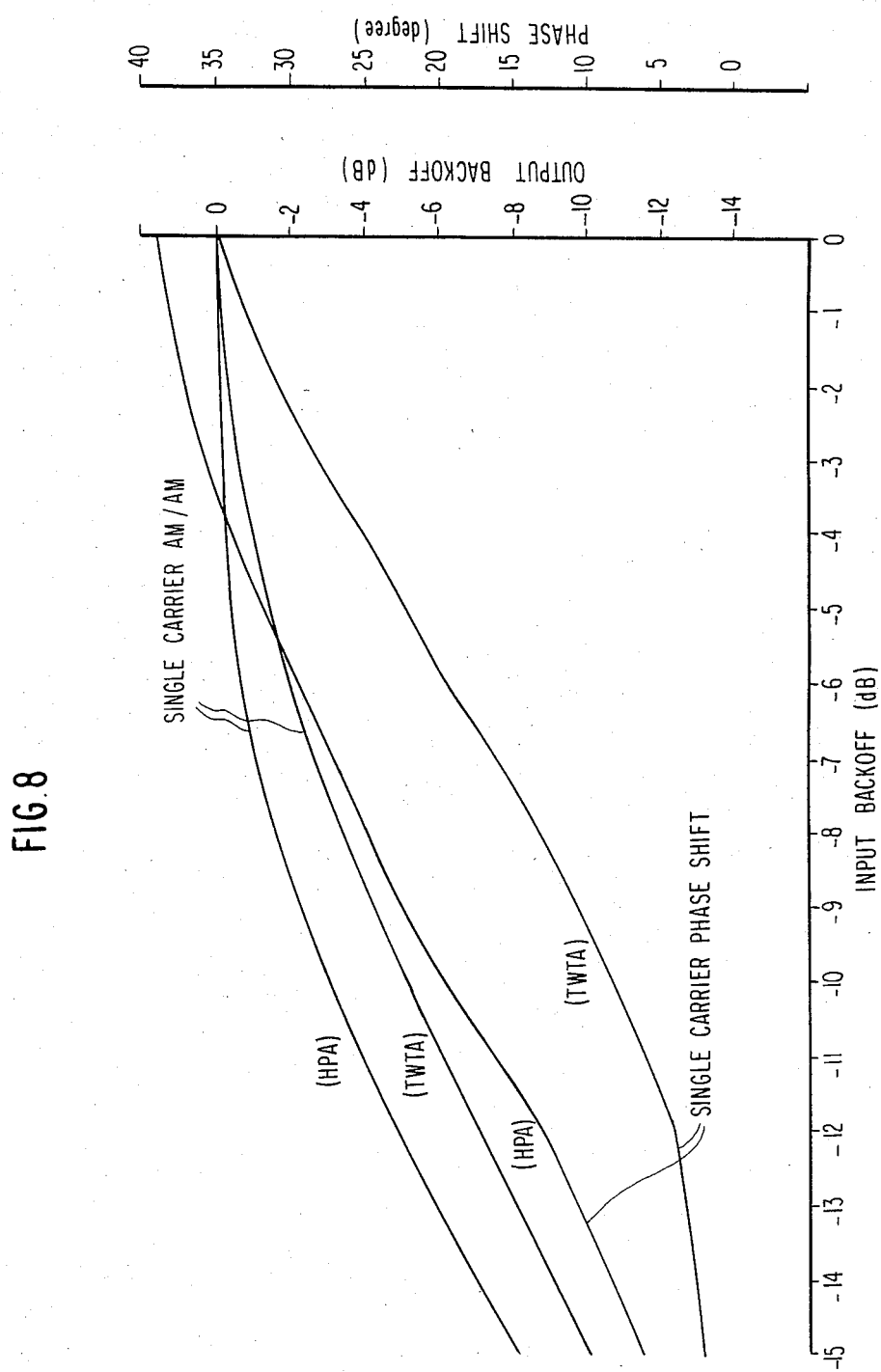
FIG. 8 is a graph of the gain transfer and phase shift characteristics of a typical HPA and transponder TWTA.

It should be noted that $Y^{(0)}(f)$ as given by Equation (29) is an arbitrary symmetrical function, and can be chosen so that the equalizer whose transfer function is $Y_{C+}^{(1)}(f)$ is easily realizable. Specifically, if the input multiplex filter $F_{11}$ ($Y_{C+}^{(11)}(f)$ in (29)) has an amplitude and group delay response as shown in FIGS. 9A and 9B respectively, and the measured gain transfer and phase shift characteristics of the earth station HPA and satellite transponder TWTA are as shown in FIG. 8, then values for the four components of intelligible crosstalk may be computed in accordance with equation (8). For example, if the HPA input backoff is set at −10 db then that computation would yield the values for $DN_1$ and $DN_2$ as shown in FIG. 5. Next, an arbitrary symmetric function $Y^{(0)}(f)$ having amplitude and group delay response as shown in FIGS. 10A and 10B is chosen. In this example a 6-pole Butterworth filter is chosen, however, any other appropriate filter having a symmetrical response could have been chosen. Thereafter, the amplitude and group delay responses of the equalizer ($Y_{C+}^{(1)}(f)$ in (32)) are calculated in accordance with equation 32 and are as shown in FIGS. 11A and 11B, respectively. An equalizer having the foregoing response characteristics can be easily fabricated by modifying any one of a number of known filter structures and are commercially available from the Nippon Electric Company.

In actual operations, the TWTA input backoff can be subject to variations of the order of ±2 dB about its nominal value. Furthermore, variations in the HPA operating point are expected to be about 30 15 dB due to the use of HPA uplink power control to combat uplink fadings in the 14 GHz band. Therefore, a will change from its nominal value according to variations in the HPA and TWTA input backoffs. (Note that $D_{N1}$ and $D_{N2}$ are determined by the HPA and TWTA nonlinearities and input backoffs.) Consequently, equalization becomes imperfect.

Let $\Delta D_{N1}$ and $\Delta D_{N2}$ be the variations in $D_{N1}$ and $D_{N2}$ due to the variations in the HPA and TWTA input backoffs respectively.

Under these variational conditions, from Equation (23), the overall transfer function can be represented by:

$$Y + \Delta Y = (D_{N1} + \Delta D_{N1}) Y_{C+}^{(1)}(f) + (D_{N2} + \Delta D_{N2}) Y_{C+}^{(11)}(f). \quad (34)$$

Substituting $Y_{C+}^{(1)}(f)$ as given by Equation (32) into Equation (34), and ignoring the symmetric filter portions which do not give any intelligible crosstalk under the first order approximation, the improvement factor in intelligible crosstalk ratio over that of the case in which crosstalk is produced only by the TWTA and $Y_{C+}^{(11)}(f)$ is given by:

$$-20 \log \left( \left| \frac{\Delta D_{N1}}{D_{N1}} - \frac{\Delta D_{N2}}{D_{N2}} \right| \right). \quad (35)$$

Note that if there are no variations in HPA and TWTA input backoffs, i.e., $$\Delta D_{N1} = \Delta D_{N2} = 0 \text{ or } \frac{\Delta D_{N1}}{D_{N1}} = \frac{\Delta D_{N2}}{D_{N2}},$$

then the improvement factor is infinite, or there is no intelligible crosstalk. Additionally, the improvement is independent of filters and only depends on the nonlinear characteristics of the HPA and TWTA.

EXAMPLE

Figure 7:
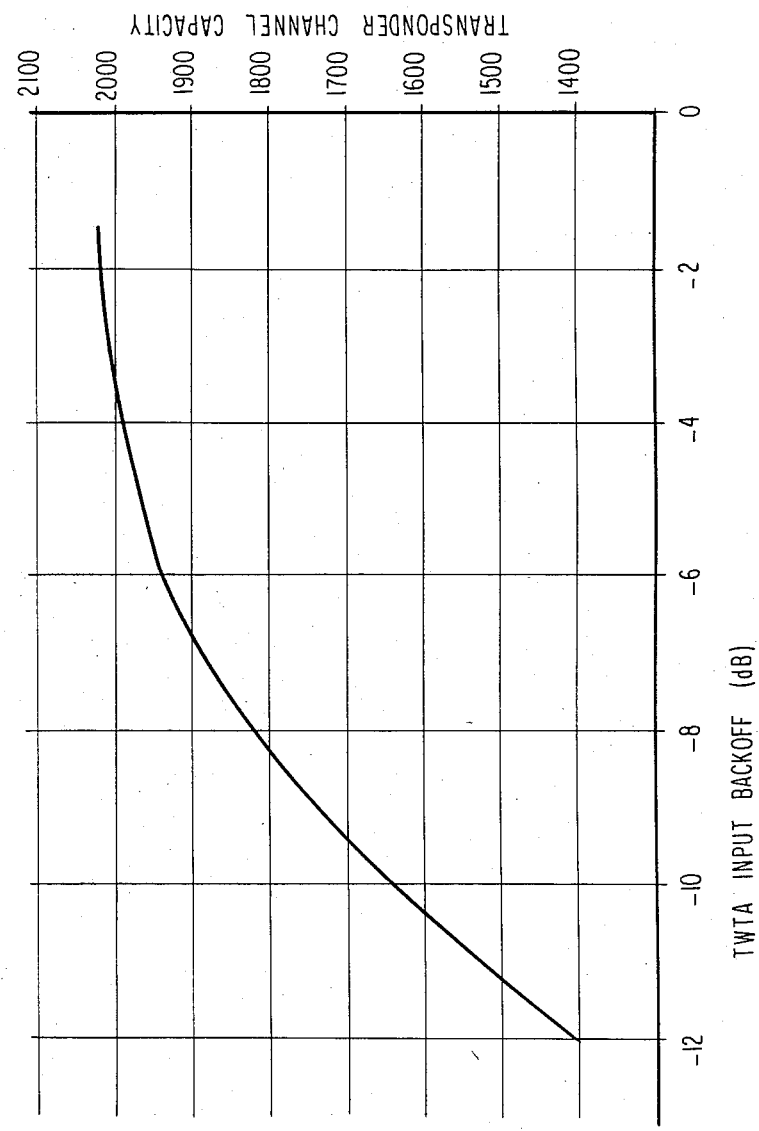
FIG. 7 is a graph of transponder capacity versus TWTA input backoff which shows the improvement in capacity when the TWTA input backoff is reduced from -12 dB to -6 dB.

Channel (1-2) is loaded with two large FDM/FM carriers (792/36 and 612/36 carriers) which are transmitted from the same HPA at an earth station. The nominal HPA and TWTA input backoffs are at about $-22$ dB and $-12$ dB respectively. It is now assumed that these nominal HPA and TWTA operating points are to be set at $-16$ dB and $-6$ dB respectively so that the transponder can carry two 972/36 carriers. Thus, an increase of 6 dB is allowed for each carrier power, as shown in FIG. 7. For uplink fadings up to 15 dB, the improvement factor is estimated to be about 11 dB. These estimates are obtained using the HPA and TWTA non-linear characteristics given in FIG. 8. From these results, it can be seen that under uplink clear-sky conditions and when the HPA and TWTA operating points can be properly maintained, the improvement in intelligible crosstalk reduction is quite substantial, and the channel capacity of the carriers can be greatly increased.

What is claimed is:

1. A satellite communications system, comprising: a transmitting earth station including at least two discrete carrier signal sources for producing two carrier signals, two modulators for individually modulating said two carrier signals and producing two modulated signals, modulator filter means for filtering said two modulator signals and producing two filtered signals, and a high power amplifier for amplifying said two filtered signals and transmitting two amplified signals, said high power amplifier having first non-linear transfer characteristics which produce intelligible crosstalk between said two transmitted amplified signals, and a receiving satellite including an input multiplex filter means for multiplexing said two transmitted amplified signals and producing two multiplexed signals, and a transponder travelling wave tube amplifier means for receiving said two multiplexed signals and producing two transponder output signals, said transponder travelling wave tube amplifier means having second non-linear transfer characteristics which produce intelligible crosstalk between said two transponder output signals, said modulator filter means of said transmitting earth station comprising an equalizer means for realizing a transfer function that takes into account the non-linearities of the high-power amplifier, the travelling wave tube amplifier and the responses of the input multiplexer filter, whereby said intelligible crosstalk between said two output signals is reduced under a first order approximation of the system.

2. The satellite communications system as recited in claim 1, wherein said equalizer means has an asymmetrical transfer function.

3. The satellite communications system as recited in claim 2, wherein said input multiplex filter means has an asymmetrical transfer function.

4. The satellite communications system as recited in claim 1, wherein both of said equalizer and said input multiplex filter have asymmetrical transfer functions $Y_{C+}^{(1)}(f)$ and $Y_{C+}^{(11)}(f)$ respectively, said transfer functions being expressed by the equation:

$$Y_{C+}^{(1)}(f) = (1 + a)Y^{(0)}(f) - a Y_{C-}^{(1)}(f)$$

where $$Y^{(0)}(f) = \frac{Y(f)}{D_{N1} + D_{N2}} \text{ and } a = \frac{D_{N2}}{D_{N1}}.$$

wherein $D_{N1}$ and $D_{N2}$ are coefficients depending on the first and second non-linear transfer characteristics, respectively, and $Y^{(0)}(f)$ is an arbitrary normalized symmetrical function.

5. In a satellite communications system having a transmitting earth station comprising two sources of carrier signals, an equalizer and a high power amplifier (HPA), and a receiving satellite comprising a transponder input multiplexer filter and a transponder travelling wave tube amplifier (TWTA), said carrier signals having a desired channel carrying capacity x, and said system producing intelligible crosstalk between said carrier signals at an output level corresponding to said desired channel carrying capacity whereby operation substantially below the maximum output capabilities of said HPA and TWTA is necessary to reduce such crosstalk to an acceptable level, which attendantly reduces the channel carrying capacity of said carrier signals to n such that n < x, a method for reducing crosstalk between said carrier signals to thereby enable operation at an increased output level to increase the channel carrying capacity of the carrier signals such that $n \approx x$, comprising the steps of:

(a) determining the non-linearities of the transfer characteristic of said HPA, (b) determining the non-linearities of the transfer characteristic of said transponder TWTA, and (c) establishing an asymmetrical transfer function for said equalizer which compensates for the nonlinearities of said HPA and TWTA transfer characteristics and the responses of the input multiplexer filter in a predistortional mode in a first order approximation of the system.

6. A satellite communications system, comprising: a transmitting earth station including at least two discrete carrier signal sources for producing two carrier signals, two modulators for individually modulating said two carrier signals and producing two modulated signals, modulator filter means for filtering said two modulator signals and producing two filtered signals, and a high power amplifier for amplifying said two filtered signals and transmitting two amplified signals, said high power amplifier having first non-linear transfer characteristics which produce intelligible crosstalk between said two transmitted amplified signals, and a receiving satellite including an input multiplex filter means for multiplexing said two transmitted amplified signals and producing two multiplexed signals, and a transponder travelling wave tube amplifier means for receiving said two multiplexed signals and producing two transponder output signals, said transponder travelling wave tube amplifier means having second non-linear transfer characteristics which produce intelligible crosstalk between said two transponder output signals, equalizer means in tandem with said modulator filter for realizing a transfer function that takes into account the non-linearities of the high-power amplifier, the travelling wave tube amplifier and the responses of the input multiplexer filter, whereby said intelligible crosstalk between said two output signals is reduced under a first order approximation of the system.

* * * * *